United States Patent
Song et al.

(10) Patent No.: US 9,001,823 B2
(45) Date of Patent: Apr. 7, 2015

(54) METHOD AND SYSTEM FOR SERVICE CLOCK TRANSPARENT TRANSMISSION IN OPTICAL TRANSPORT NETWORK

(75) Inventors: Xiaopeng Song, Shenzhen (CN); Yan Yuan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 401 days.

(21) Appl. No.: 13/504,291

(22) PCT Filed: Apr. 2, 2010

(86) PCT No.: PCT/CN2010/071545
§ 371 (c)(1),
(2), (4) Date: Apr. 26, 2012

(87) PCT Pub. No.: WO2010/145268
PCT Pub. Date: Dec. 23, 2010

(65) Prior Publication Data
US 2012/0207472 A1 Aug. 16, 2012

(30) Foreign Application Priority Data
Nov. 6, 2009 (CN) .......................... 2009 1 0212360

(51) Int. Cl.
*H04J 3/06* (2006.01)
*H04J 3/16* (2006.01)

(52) U.S. Cl.
CPC ............. *H04J 3/0623* (2013.01); *H04J 3/1652* (2013.01); *H04J 2203/0082* (2013.01)

(58) Field of Classification Search
CPC ................................................... H04J 3/1652
USPC ..................................... 370/364, 374; 398/58
See application file for complete search history.

(56) References Cited

U.S. PATENT DOCUMENTS 8,462,816 B2 * 6/2013 Yin ............................... 370/474
2002/0167897 A1 11/2002 Tateno et al.
(Continued)

FOREIGN PATENT DOCUMENTS

CN 1400742 A 3/2003
CN 1983888 A 6/2007
(Continued)

OTHER PUBLICATIONS

International Search Report dated Aug. 5, 2010 for PCT/CN2010/071545.

*Primary Examiner* — Mark Rinehart
*Assistant Examiner* — Matthew Hopkins
(74) *Attorney, Agent, or Firm* — Banner & Witcoff, Ltd.

(57) ABSTRACT

A method and system for service clock transparent transmission in an optical transport network (OTN) are provided. The system includes a service accessing end and an OTN receiving end; the method includes the following steps: the OTN receiving end performs de-mapping operation to an OTN frame after receiving the OTN frame, and performs two-level buffering operation to the service data flow recovered therefrom, a first buffering unit performs a homogenization treatment to the service data flow and then outputs to a second buffering unit, which the second buffering unit outputs the service data flow according to the service clock after receiving the service data flow. After adopting the present invention, it is able to ensure that the quality of the recovered service clock is relatively higher, which meets the customer requirement on the related specification of the service clock.

10 Claims, 4 Drawing Sheets

(56) References Cited

U.S. PATENT DOCUMENTS

2004/0062277 A1* 4/2004 Flavin et al. .................. 370/474
2010/0208752 A1* 8/2010 Julien et al. .................. 370/476

FOREIGN PATENT DOCUMENTS

| CN | 101404618 A | 4/2009 |
| CN | 101425890 A | 5/2009 |

* cited by examiner

METHOD AND SYSTEM FOR SERVICE CLOCK TRANSPARENT TRANSMISSION IN OPTICAL TRANSPORT NETWORK

TECHNICAL FIELD

The present invention relates to the field of communication transmission network, and in particular, to a method and system for service clock transparent transmission in an optical transport network (OTN).

BACKGROUND OF THE RELATED ART

With the development of the communication system, the OTN becomes the mainstream of the transmission network gradually, and in particular, the development of the cross switch technology based on the OTN makes the OTN develop into a bearing platform of the multiple services gradually. However, in some services or application systems, it is required to transparently transfer the client signal clock.

The traditional solution is to adopt the synchronous mapping way, that is, the service clock is used to perform encapsulating to the service data flow in OTN. This kind of application requires that there is a fixed frequency ratio between the accessing service and the OTN service, and the transparent transferring of the multi-channel customer service clock cannot be realized, which has more restrictions in the applications.

The asynchronous mapping way is mostly adopted when the customer service is transmitted through the OTN, that is, the service data flow is read in the service accessing end according to the service clock, and then the read service data flow is encapsulated into an OTN payload according to the OTN clock. After adopting this mapping way, the service clock information will be kept in the service data flow, so the service clock information needs to be recovered at the OTN receiving end.

SUMMARY OF THE INVENTION

The technical problem that the present invention requires to solve is to provide a method and system for service clock transparent transmission in an optical transport network, to realize the objective of recovering the high quality customer service synchronous clock when asynchronously mapping is used.

In order to solve the above-mentioned problem, the present invention provides a method for service clock transparent transmission in an optical transport network (OTN), comprising:

an OTN receiving end performing de-mapping operation to an OTN frame after receiving the OTN frame to recover a service data flow therefrom, and inputting the service data flow to a first buffering unit, the first buffering unit performing a homogenization treatment to the service data flow and then outputting to a second buffering unit, and the second buffering unit outputting the service data flow according to the service clock after receiving the service data flow.

The above-mentioned method further has the following characteristics:

in the step of the first buffering unit performing a homogenization treatment to the service data flow and then outputting to a second buffering unit, the first buffering unit reads the service data flow into the present unit according to an OTN clock, and reads out the service data flow from the present unit according to the OTN clock under control of a reading enabling signal and sends to the second buffering unit;

a preset value of a ratio of a number of cycles indicating that a reading signal is in an enabling status of the reading enabling signal to a total cycle of the reading enabling signal equals a quotient of service clock frequency and OTN clock frequency;

the method further comprises: adjusting the number of cycles indicating that the reading signal is in the enabling status of the reading enabling signal accordingly through judging whether status of the first buffering unit is empty or full.

The above-mentioned method further has the following characteristics:

in the step of the second buffering unit outputting the service data flow according to a service clock after receiving the service data flow, the second buffering unit writes the service data flow sent by the first buffering unit into the present unit according to the OTN clock, and then reads out the service data flow locally according to the service clock provided by a phase locked loop (PLL);

a center clock frequency of the PLL is a nominal value of the service clock frequency of the service data flow;

the method further comprises: the PLL adjusting the service clock according to amount of data bulk in the second buffering unit.

The above-mentioned method further has the following characteristics:

The method further comprises a step to generate the reading enabling signal, and the step comprises:

1), according to a standard frequency deviation of the service clock and the OTN clock, confirming gap width of the reading enabling signal; wherein, the ratio of a number of clock cycles occupied by the gap to a total number of clock cycles is N/M;

2), initializing a value of a counter generating the reading enabling signal as 1;

3), checking whether the first buffering unit has already finished an initialization operation; if finished, then executing a next step; if not finished, initializing the first buffering unit, and executing step 3) again;

4), judging whether a current value of the counter equals M−N, if yes, executing step 5); if not, judging whether the current value of the counter is M, if yes, then executing step 6), and if not, executing step 8);

5), judging whether the data bulk in the first buffering unit is less than a preset second threshold value, if yes, then executing step 7), if not, then executing step 8);

6), judging whether the data in the first buffering unit are greater than a preset first threshold value, if yes, then executing step 8), if not, then executing step 7);

7), setting the reading enabling signal one clock cycle lower, and entering step 9);

8), setting the reading enabling signal one clock cycle higher, and entering step 9); and 9), judging whether the current value of the counter is M, if yes, setting the counter value as 1, and then jumping to step 4); if not, accumulating the counter, and then jumping to step 4).

The above-mentioned method further has the following characteristics: the first threshold value and the second threshold value follow the following rules:

data between an original waterline of the first buffering unit and the second threshold value is enough to remedy a longest gap of invalid data written into the first buffering unit in a normal case;

a data space between the first threshold value and the original waterline of the first buffering unit is enough to ensure that data in the first buffering unit will not exceed the first threshold value in a case that the data written in the first buffering unit are longest sustained to be valid in the normal case;

data capacity between the first threshold value to fully writing the first buffering unit and the second threshold value to reading empty the first buffering unit is enough to ensure not to make the service data flow in the first buffering unit overflow before corresponding adjustment becomes effective.

The present invention further provides a system for service clock transparent transmission in an optical transport network (OTN), comprising a service accessing end and an OTN receiving end; wherein, the service accessing end is configured to: read a service data flow according to the service clock, and then encapsulate the service data flow into a payload of an OTN frame according to an OTN clock, and send the OTN frame to the OTN receiving end through the OTN;

the OTN receiving end comprises a service de-mapping module and a service clock recovery module;

the service de-mapping module is configured to perform de-mapping operation to the OTN frame after receiving the OTN frame and recover the service data flow therefrom;

the service clock recovery module is configured to perform a two-level buffering operation to the service data flow recovered by the service de-mapping module, wherein, the service clock recovery module comprises a first buffering unit and a second buffering unit;

the first buffering unit is configured to perform a homogenization treatment to the service data flow and then output to the second buffering unit;

the second buffering unit is configured to output the service data flow according to the service clock after receiving the service data flow after the homogenization treatment.

The above-mentioned system further has the following characteristics:

the service clock recovery module further comprises a data reading control unit;

the data reading control unit is configured to generate a reading enabling signal, and control reading operation of the first buffering unit by using the reading enabling signal; wherein, a preset value of a ratio of a number of cycles indicating that a reading signal is in an enabling status of the reading enabling signal to a total cycle of the reading enabling signal equals a quotient of service clock frequency and OTN clock frequency; the data reading control unit is further configured to continually adjust the number of cycles indicating that the reading signal is in the enabling status of the reading enabling signal accordingly through judging whether status of the first buffering unit is empty or full;

the first buffering unit is configured to read the service data flow into the present unit according to an OTN clock, reads out the service data flow from the present unit according to the OTN clock under control of the reading enabling signal and sends to the second buffering unit.

The above-mentioned system further has the following characteristics:

the service clock recovery module further comprises a phase locked loop (PLL);

the second buffering unit is configured to write the service data flow sent by the first buffering unit into the present unit according to the OTN clock, and then reads out the service data flow locally according to the service clock provided by the PLL;

the PLL is configured to provide the service clock for the second buffering unit, regard a center clock frequency of the PLL as a nominal value of the service clock frequency of the service data flow, and adjust the service clock according to amount of data bulk in the second buffering unit.

The above-mentioned system further has the following characteristics:

the first buffering unit is further configured with a first threshold value and a second threshold value, data between an original waterline of the first buffering unit and the second threshold value is enough to remedy a longest gap of invalid data written into the first buffering unit in a normal case;

a data space between the first threshold value and the original waterline of the first buffering unit is enough to ensure that data in the first buffering unit will not exceed the first threshold value in a case that the data written in the first buffering unit are longest sustained to be valid in the normal case;

data capacity between the first threshold value to fully writing the first buffering unit and the second threshold value and reading empty the first buffering unit is enough to ensure not to make the service data flow in the first buffering unit overflow before corresponding adjustment becomes effective.

The present invention further provides an optical transport network (OTN) receiving apparatus of a system for service clock transparent transmission in an OTN, wherein, the OTN receiving apparatus comprises a service de-mapping module and a service clock recovery module;

the service de-mapping module is configured to perform de-mapping operation to an OTN frame after receiving the OTN frame and recover a service data flow therefrom;

the service clock recovery module is configured to perform a two-level buffering operation to the service data flow recovered by the service de-mapping module, wherein, the service clock recovery module comprises a first buffering unit and a second buffering unit;

the first buffering unit is configured to perform a homogenization treatment to the service data flow and then output to the second buffering unit;

the second buffering unit is configured to output the service data flow according to the service clock after receiving the service data flow after the homogenization treatment.

The above-mentioned apparatus further has the following characteristics:

the service clock recovery module further comprises a data reading control unit;

the data reading control unit is configured to generate a reading enabling signal, and control reading operation of the first buffering unit by using the reading enabling signal; wherein, a preset value of a ratio of a number of cycles indicating that a reading signal is in an enabling status of the reading enabling signal to a total cycle of the reading enabling signal equals a quotient of service clock frequency and OTN clock frequency; the data reading control unit is further configured to continually adjust the number of cycles indicating that the reading signal is in the enabling status of the reading enabling signal accordingly through judging whether status of the first buffering unit is empty or full;

the first buffering unit is configured to read the service data flow into the present unit according to an OTN clock, reads out the service data flow from the present unit according to the OTN clock under control of the reading enabling signal and sends to the second buffering unit.

The above-mentioned apparatus further has the following characteristics:

the service clock recovery module further comprises a phase locked loop (PLL);

the second buffering unit is configured to write the service data flow sent by the first buffering unit into the present unit according to the OTN clock, and then reads out the service data flow locally according to the service clock provided by the PLL;

the PLL is configured to provide the service clock for the second buffering unit, regard a center clock frequency of the PLL as a nominal value of the service clock frequency of the service data flow, and adjust the service clock according to amount of data bulk in the second buffering unit.

The above-mentioned apparatus further has the following characteristics:

the first buffering unit is further configured with a first threshold value and a second threshold value, data between an original waterline of the first buffering unit and the second threshold value is enough to remedy a longest gap of invalid data written into the first buffering unit in a normal case; a data space between the first threshold value and the original waterline of the first buffering unit is enough to ensure that data in the first buffering unit will not exceed the first threshold value in a case that the data written in the first buffering unit are longest sustained to be valid in the normal case; and data capacity between the first threshold value to fully writing the first buffering unit and the second threshold value and reading empty the first buffering unit is enough to ensure not to make the service data flow in the first buffering unit overflow before corresponding adjustment becomes effective.

After adopting the present invention, the service data flow is relatively homogeneously written into the second buffering unit, in this way, it can ensure that the data filled in the second buffering unit are relatively stable, and the generated phase-locked loop control signal will not perform adjustment by a wide margin to the phase-locked loop, thus being able to ensure that the quality of the recovered service clock is relative higher, which meets the customer requirement on the related specification of the service clock.

PREFERRED EMBODIMENTS OF THE PRESENT INVENTION

The technical scheme of the present invention is described in detail with reference to the accompanying drawings and in combination with embodiments hereinafter.

The basic idea of the method described by the present invention is that: the OTN receiving end performs the de-mapping operation to an OTN frame after receiving the OTN frame, and performs two-level buffering operation to the service data flow after recovering the service data flow therefrom, a first buffering unit performs a homogenization treatment to the service data flow and then outputs to a second buffering unit, the second buffering unit outputs the service data flow according to the service clock after receiving the service data flow.

Wherein, the first buffering unit performing a homogenization treatment to the service data flow and then outputting to a second buffering unit refers to: the first buffering unit reads the service data flow into the present unit according to an OTN clock and reads out from the present unit according to the OTN clock under the control of a reading enabling signal and sends to the second buffering unit. Wherein, a preset value of a ratio of a number of cycles indicating that a reading signal is in an enabling status of the reading enabling signal to a total cycle of the reading enabling signal equals a quotient of service clock frequency and OTN clock frequency; and afterward adjusts the number of cycles indicating that the reading signal is in the enabling status of the reading enabling signal accordingly through judging whether status of the first buffering unit is empty or full, that is, when the data bulk in the first buffering unit exceeds the preset first threshold value, the number of cycles indicating that the reading signal is in the enabling status of the reading enabling signal is increased; when the data bulk in the first buffering unit is lower than the preset second threshold value, the number of cycles indicating that the reading signal is in the enabling status of the reading enabling signal is reduced.

The second buffering unit outputting the service data flow according to the service clock after receiving refers to that the second buffering unit locally writes in the service data flow sent by the first buffering unit according to the OTN clock, and then reads out the service data flow locally according to the service clock provided by a phase locked loop (PLL); wherein, the center clock frequency of the PLL is a nominal value of the service clock frequency of the service data flow; and the PLL adjusts the service clock according to amount of data bulk in the second buffering unit.

Figure 1:
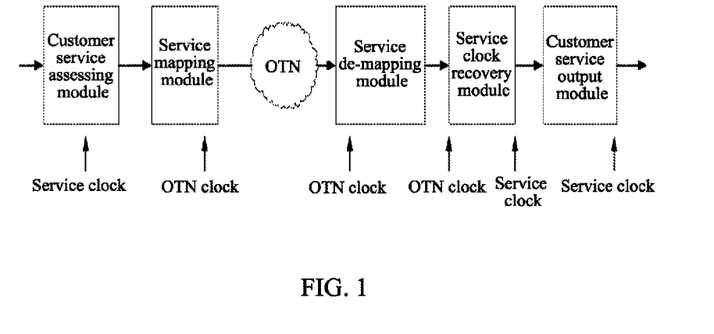
FIG. 1 is a structure diagram of a system for service clock transparent transmission in an optical transport network according to an example of the present invention.

As shown in FIG. 1, when the service data flow is transmitted by adopting the asynchronous mapping way, the customer service assessing module reads the service data flow according to the service clock and then sends to the service mapping module in the service accessing end; the service mapping module encapsulates the received service data flow into a payload of an OTN frame according to an OTN clock, and then sends the OTN frame to the service sending end (i.e. the OTN receiving end) through the OTN; the service de-mapping module of the OTN receiving end recovers the service data flow through the de-mapping operation after receiving the OTN frame, when the OTN clock is used for the service data flow at that moment, and the data valid signal is used to indicate which data are valid. Then the service de-mapping unit sends the service data flow to the service clock recovery module, and after the service clock of the service data flow is recovered by the service clock recovery module, the service data flow is outputted through the customer service output module.

Figure 2:
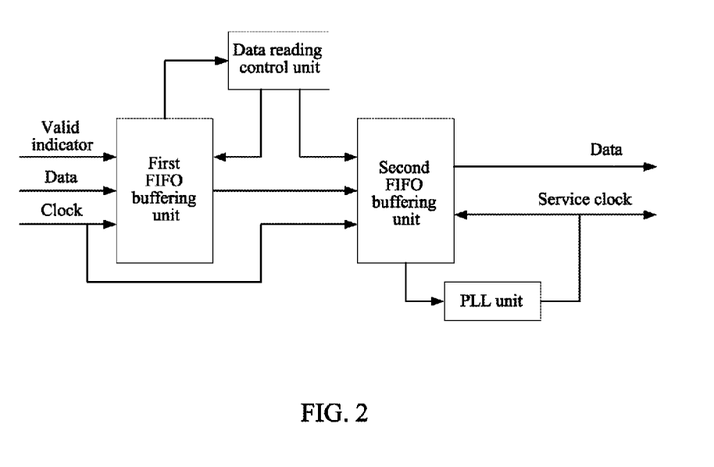
FIG. 2 is a structure diagram of a service clock recovery unit according to an example of the present invention.

Wherein, the structure of the service clock recovery module is shown in FIG. 2, including: a first input first output (FIFO) buffering unit, a second FIFO buffering unit, a data reading control unit and the a phase locked loop (PLL) unit.

The reading and writing clocks of the first FIFO buffering unit are all the OTN clocks, which are mainly used for finishing the homogenization treatment of the service data flow. For the reason of the OTN frame structure, it will cause that there is no service data flow within a continuous time period in the frame head and the overhead part of the forward error correction (FEC), and this way it will cause that the service data flow is distributed homogeneously. In addition, the specific service, such as, gigabit Ethernet (GE), etc., needs the encapsulation of the intermediate layer, such as the generic framing procedure (GFP) and the generic mapping procedure (GMP), etc., to be mapped into the OTN payload, and when decapsulating the intermediate layer, it will further cause the service data flow not to be distributed homogeneously. No matter the service data flow is distributed homogeneous or not, the rate of the valid service data flow equals the service clock frequency, which is a fixed value, and the OTN clock frequency is also the fixed value, so the ratio of the OTN clock frequency to the service clock frequency is a fixed value too.

The data reading control unit is mainly used to generate the relatively smooth reading enabling signal, generate a regular reading enabling signal according to the ratio between the above-mentioned OTN clock value and the nominal value of the service clock, and read the data from the first FIFO buffering unit to send to the second FIFO buffering unit. When the data bulk in the first FIFO buffering unit exceeds the first threshold value or lower than the second threshold value, the data reading control unit needs to appropriately adjust the gap width of the above-mentioned reading enabling signal, and ensure that the service data flow in the first FIFO buffering unit will not overflow.

The second FIFO buffering unit is an asynchronous FIFO, the writing clock is an OTN clock, and the reading clock is a service clock, thus realizing the handover from the OTN clock to the service clock. The service clock is provided by the PLL unit, the center clock frequency of the PLL unit is a nominal speed rate of the service data flow, and the value of the service nominal speed rate equals the ratio of the line speed rate to the data bit width. The second FIFO buffering unit generates the control signal controlling the PPL unit according to the data filling situation therein, performs the fine tuning to the service clock, and ensures the data bulk in the second FIFO buffering unit maintains at a stable range.

The present invention is suitable for a plurality of application scenarios, including but not limited to the following contents: asynchronously de-mapping the constants bit rate (CBR) service from the OTUk, de-mapping a plurality of low speed OTUj (k>j) services from 1 high speed OTUk, and de-mapping the customer service from the generic mapping procedure (GMP), asynchronous mapping procedure (AMP) and the GFP.

It is further illustrated in detail with two application examples of the present invention hereinafter.

Example 1

4 Lines OTU2 are Asynchronously Mapped to the OTU3

Figure 3:
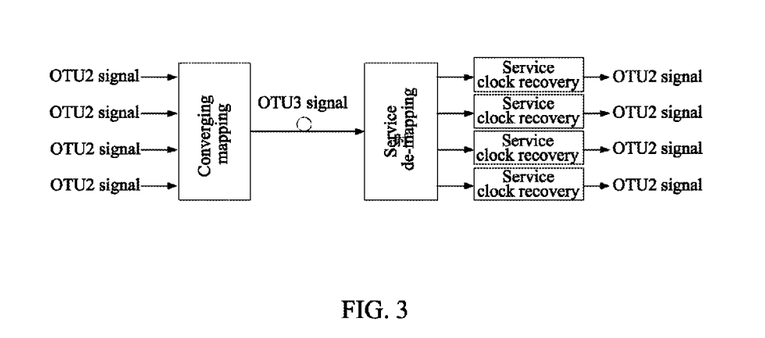
FIG. 3 is a diagram of a system for de-mapping an OTU2 from an OUT3 according to an application example of the present invention.

As shown in FIG. 3, 4 lines OTU2 signals are converged as 1 line OTU3 signal according to the mapping way specified in standard G.709; and in the de-converging direction, the service de-mapping module recovers 4 lines independent OTU2 data flows according to the way specified in standard G.709, and sends to each line of service clock recovery module respectively, and the service clock recovery module generates the final OTU2 service clock.

The service clock recovery module is described in detail hereinafter.

The frequency of the internal processing clock (that is, the OTN clock) of the OTU3 signal is about 155.52*255/236 MHz (the clock passed 256 frequency demultiplications), and the frequency of the internal processing clock (that is, the service clock) of the OTU2 signal is about 155.52*255/237 MHz (the clock passed 64 frequency demultiplications), which is a little slower than the internal processing clock of the OTU3. The OTU2 data flow outputted by the service de-mapping module uses the internal processing clock of the OTU3, and indicates the valid data through the valid indicator signal of the data, as shown in FIG. 4, and with the influence of the frame head, the FEC overhead, the justification control bytes (JC) adjustment and the clock frequency difference, the gap width of the valid indicator signal of OTU2 data (that is, the number of cycles sustaining the low level) and the appearance rule is relatively unfixable.

Figure 4:
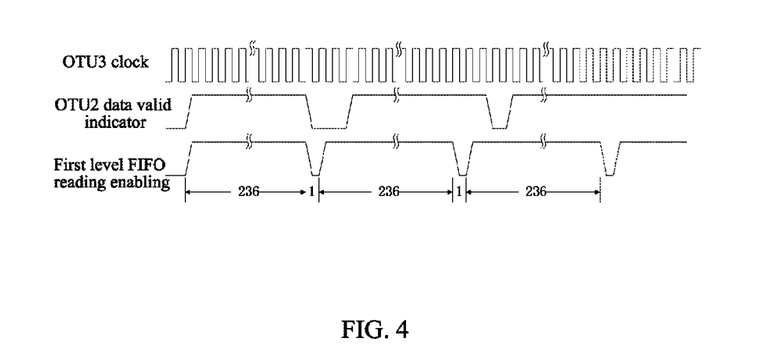
FIG. 4 is a diagram of a gap of a reading enabling signal according to an application example of the present invention.

The data reading control unit generates the reading enabling signal to read the data in the first FIFO buffering unit, and the reading enabling signal is relatively regular, as shown in FIG. 4.

The generation rule of the reading enabling signal is as follows:

1), according to the frequency difference of the nominal values of the OTU3 clock and the OTU2 clock, the gap rule of the reading enabling signal is calculated. The ratio of the OTU3 clock frequency to the OTU2 clock frequency is 237/236, that is, every 237 OTU3 clock cycles correspond to 236 OTU2 clock cycles. So, when no adjusting is made, after being set to be high for 236 OTU3 clock cycles continuously, the reading enabling signal of the first FIFO buffering unit is set to be low for one cycle;

2), when the data bulk in the first FIFO buffering unit is greater than the set upper waterline (that is, the first threshold value), it needs to accelerate the speed of reading data from the first FIFO buffering unit, and at this moment, the reading enabling signal continues to be high and is no longer set as low;

3), when the data bulk in the first FIFO buffering unit is lower than the set lower waterline (that is, the second threshold value), it needs to slow down the speed of reading data from the first FIFO buffering unit, and at this moment, the reading enabling signal is set as low for two continuous clock cycles after being set as high for 235 OTU3 clock cycles continuously.

4), the adjustment to the reading enabling signal needs to be able to remedy the frequency difference of the service clock and the OTN clock under the worst case specified by the standard. According to this way, one positive 1 or negative 1 adjustment can be made every 237 clock cycles, which meet the requirement.

Figure 5:
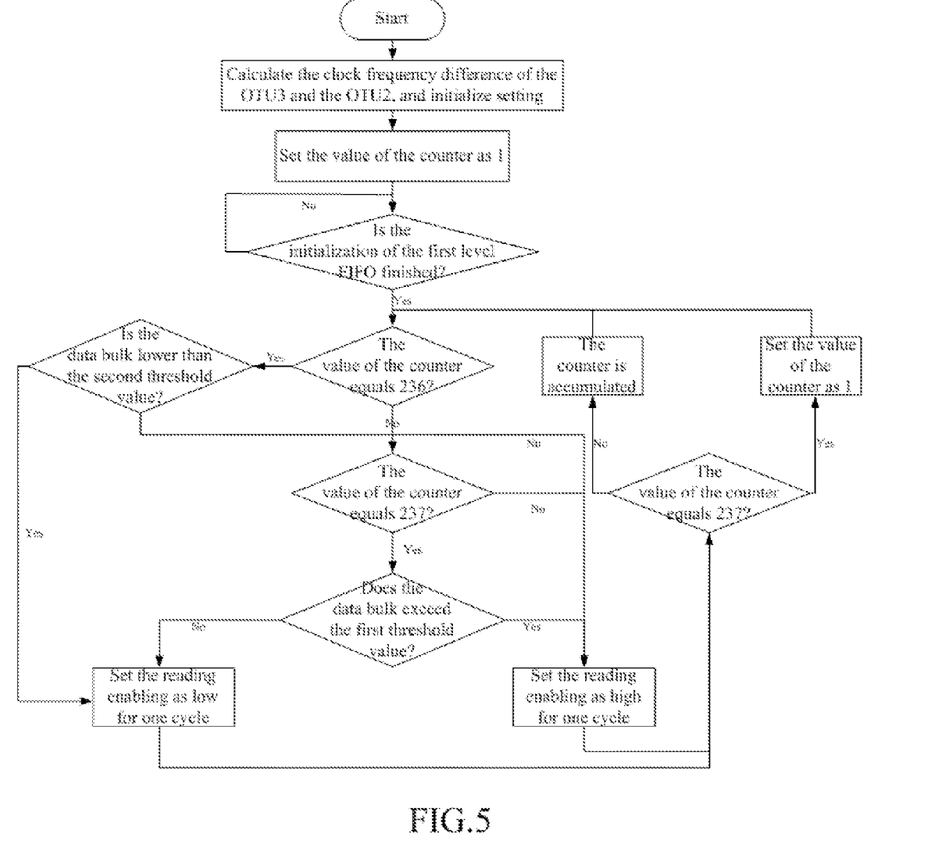
FIG. 5 is a flow chart of generating a reading enabling signal according to an application example of the present invention.

Referring to FIG. 5, the operation steps for generating the reading enabling signal are as follows:

1), according to the standard frequency deviation of the OTU3 clock and the OTU2 clock, confirming the generation rule of the reading enabling signal, that is, after every 236 OTN3 clock cycles are set to be high level, 1 cycle is set as low level; certainly, after every a positive integral multiple of 236 OTN3 clock cycles are set to be high level, the same multiple cycles can be set as low level;

2), initializing a value of a counter generating the reading enabling signal as 1;

3), detecting whether the first FIFO buffering unit has already finished an initialization operation; if finished, then the next step is executed; if not, then the initialization is performed on the first FIFO buffering unit, and step 3) is executed again;

4), judging whether a current value of the counter equals 236, if yes, step 5) is executed; or else, judging whether the current value of the counter is 237, if yes, then step 6) is executed, or else, step 8) is executed;

5), judging whether the data bulk in the first FIFO buffering unit is less than the second threshold value, if being less, then step 7) is executed, or else, then step 8) is executed;

6), judging whether the data in the first FIFO buffering unit are greater than the first threshold value, if being greater, then step 8) is executed, or else, then step 7) is executed;

7), setting the reading enabling signal one clock cycle lower, and entering step 9);

8), setting the reading enabling signal one clock cycle higher, and entering step 9);

9), judging whether the current value of the counter is 237, if yes, the counter value is set as 1; or else, accumulation is performed to the counter, and then jumping to step 4).

The confirmation rule of the upper and lower waterline of the first FIFO buffering unit is as follows:

1), the data between the original waterline of the first FIFO buffering unit (that is, after the initialization, the data begins to be read after the data capacity in the first FIFO buffering unit reaches the waterline) and the lower waterline is enough to remedy the longest gap of the invalid data written into the first FIFO buffering unit in the normal case;

2), the data space between the upper waterline and the original waterline of the first FIFO buffering unit is enough to ensure that data in the first FIFO buffering unit will not exceed the upper waterline in a case that the data written into the first FIFO buffering unit are longest sustained to be valid in the normal case. The typical algorithmic method is: the longest time when the data are sustained to be valid*(1−236/237). Wherein, the value of the longest time when the data are sustained to be valid is correlated with the mapping way;

3), the data capacity between the upper waterline to fully writing the first FIFO buffering unit and the lower waterline to reading empty the first FIFO buffering unit is able to ensure not to make the service data flow in the first FIFO buffering unit overflow before corresponding adjustment becomes effective (here the adjustment refers to setting high or setting low for the reading enabling signal).

Figure 6:
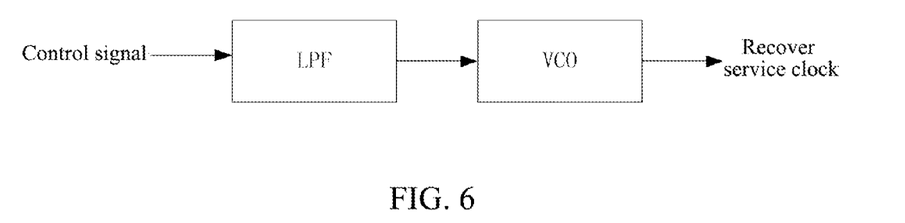
FIG. 6 is a structure diagram of a phase locked loop according to an example of the present invention.

The reading enabling signal generated according to the above-mentioned rule, the longest sustaining cycle of the data invalid cycle read out from the first FIFO buffering unit is 1 or 2 OTU3 clock cycles, which ensures the buffering data in the second FIFO buffering unit to be relatively stable. According to the buffering data bulk in the second FIFO buffering unit, the control signal of the phase locked loop is generated, and after passing the low pass filter (LPF) and the voltage-controlled voltage of the voltage-controlled oscillator (VCO), it realizes the adjustment to the clock frequency output by the phase-locked loop, as shown in FIG. 6.

The generation rule of the above-mentioned PLL control signal is as follows:

1), according to the case of the invalid data output by the first FIFO buffering unit, setting the upper waterline and the lower waterline of the second FIFO buffering unit; and 2), generating the control signal according to the depth information of the second FIFO buffering unit, and ensuring that the change of the FIFO depth can be reflected on the control signal fast, and ensuring that the second FIFO buffering unit will not be empty or full.

Example 2

GE Service Clock Transportation

Figure 7:
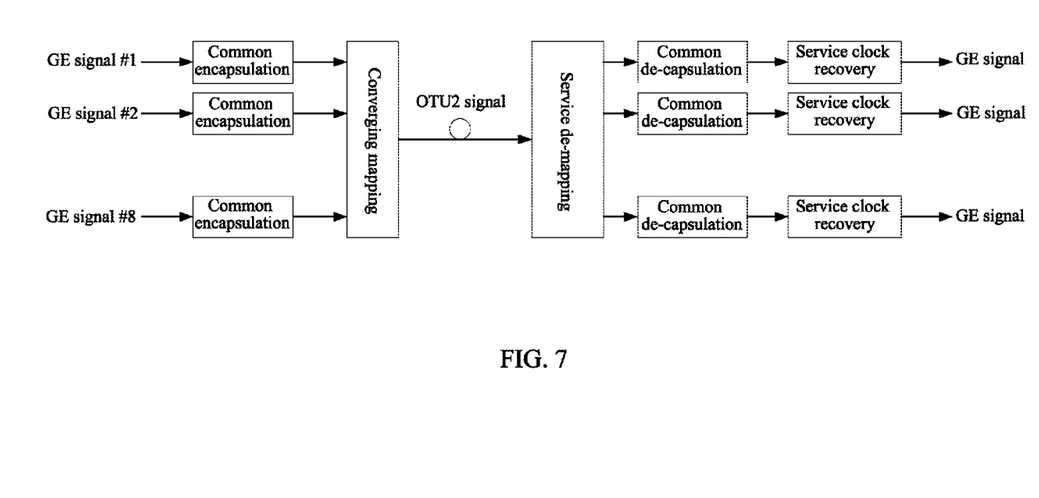
FIG. 7 is a structure diagram of a system for service clock transparent transmission after 8 lines of GE services are mapped to an OTU2 according to an application example of the present invention.

Another typical application using the present invention is to transport the Ethernet clock through the OTN, which realizes the function of synchronizing the Ethernet. As shown in FIG. 7, 8 lines GE services are mapped into the OTU2 according to the standard way after passing the common encapsulation, and in the de-mapping direction, after de-converging and common de-capsulation, the GE data flow synchronous with the OTU2 clock is obtained respectively. Through the service clock recovery unit, it can recover the GE service clock of each channel. The implementation method of the service clock recovery unit is shown in FIG. 1.

Obviously, the present invention can have a variety of other examples. Those skilled in the art can make the corresponding modifications and variations according to the present invention without departing from the spirit and essence of the present invention. And all of these modifications and the variations should be embodied in the scope of the appending claims of the present invention.

INDUSTRIAL APPLICABILITY

After adopting the present invention, the service data flow is relatively homogeneously written into the second buffering unit, in this way, it can ensure that the data filled in the second buffering unit are relatively stable, and the generated phase-locked loop control signal will not perform the adjustment by a wide margin to the phase-locked loop, thus being able to ensure that the quality of the recovered service clock is relative higher, which meets the customer requirement on the related specification of the service clock.

We claim:

1. A method for service clock transparent transmission in an optical transport network (OTN), comprising:
an OTN receiving end performing a de-mapping operation to an OTN frame after receiving the OTN frame to recover a service data flow therefrom, and inputting the service data flow to a first buffering unit, the first buffering unit performing a homogenization treatment to the service data flow and then outputting to a second buffering unit, and the second buffering unit outputting the service data flow according to a service clock after receiving the service data flow;
wherein,
in the step of the first buffering unit performing a homogenization treatment to the service data flow and then outputting to a second buffering unit, the first buffering unit reads the service data flow into the present unit according to an OTN clock, and reads out the service data flow from the present unit according to the OTN clock under control of a reading enabling signal and sends to the second buffering unit;
a preset value of a ratio of a number of clock cycles indicating that a reading signal is in an enabling status of the reading enabling signal to a total number of clock cycles of the reading enabling signal equals to a quotient of service clock frequency and OTN clock frequency;
the method further comprises: adjusting the number of clock cycles indicating that the reading signal is in the enabling status of the reading enabling signal accordingly through judging whether status of the first buffering unit is empty or full.

2. The method according to claim 1, wherein,
in the step of the second buffering unit outputting the service data flow according to a service clock after receiving the service data flow, the second buffering unit writes the service data flow sent by the first buffering unit into the present unit according to the OTN clock, and then reads out the service data flow locally according to the service clock provided by a phase locked loop (PLL);
a center clock frequency of the PLL is a nominal value of the service clock frequency of the service data flow;
the method further comprises: the PLL adjusting the service clock according to an amount of data bulk in the second buffering unit.

3. The method according to claim 1, further comprising a step to generate the reading enabling signal, and the step comprises:
1), according to a standard frequency deviation of the service clock and the OTN clock, confirming gap width of the reading enabling signal; wherein, the ratio of a number of clock cycles occupied by the gap to a total number of clock cycles is N/M;
2), initializing a value of a counter generating the reading enabling signal as 1;
3), checking whether the first buffering unit has already finished an initialization operation; if finished, then executing a next step; if not finished, initializing the first buffering unit, and executing step 3) again;
4), judging whether a current value of the counter equals M-N, if yes, executing step 5); if not, judging whether the current value of the counter is M, if yes, then executing step 6), and if not, executing step 8);
5), judging whether the data bulk in the first buffering unit is less than a preset second threshold value, if yes, then executing step 7), if not, then executing step 8);
6), judging whether the data in the first buffering unit are greater than a preset first threshold value, if yes, then executing step 8), if not, then executing step 7);
7), setting the reading enabling signal one clock cycle lower, and entering step 9);
8), setting the reading enabling signal one clock cycle higher, and entering step 9); and
9), judging whether the current value of the counter is M, if yes, setting the counter value as 1, and then jumping to step 4); if not, accumulating the counter, and then jumping to step 4).

4. The method according to claim 3, wherein, the first threshold value and the second threshold value follow the following rules:
data between an original waterline of the first buffering unit and the second threshold value is enough to remedy a longest gap of invalid data written into the first buffering unit in a normal case;
a data space between the first threshold value and the original waterline of the first buffering unit is enough to ensure that data in the first buffering unit will not exceed the first threshold value in a case that the data written in the first buffering unit are longest sustained to be valid in the normal case;
data capacity between the first threshold value to fully writing the first buffering unit and the second threshold value to reading empty the first buffering unit is enough to ensure not to make the service data flow in the first buffering unit overflow before corresponding adjustment becomes effective.

5. A system for service clock transparent transmission in an optical transport network (OTN), comprising a service accessing end and an OTN receiving end; wherein,
the service accessing end is configured to: read a service data flow according to a service clock, and then encapsulate the service data flow into a payload of an OTN frame according to an OTN clock, and send the OTN frame to the OTN receiving end through the OTN;
the OTN receiving end comprises a service de-mapping module and a service clock recovery module;
the service de-mapping module is configured to perform a de-mapping operation to the OTN frame after receiving the OTN frame and recover the service data flow therefrom;
the service clock recovery module is configured to perform a two-level buffering operation to the service data flow recovered by the service de-mapping module, wherein,
the service clock recovery module comprises a first buffering unit and a second buffering unit;
the first buffering unit is configured to perform a homogenization treatment to the service data flow and then output to the second buffering unit;
the second buffering unit is configured to output the service data flow according to the service clock after receiving the service data flow after the homogenization treatment;
wherein,
the service clock recovery module further comprises a data reading control unit;
the data reading control unit is configured to generate a reading enabling signal, and control a reading operation of the first buffering unit by using the reading enabling signal; wherein, a preset value of a ratio of a number of clock cycles indicating that a reading signal is in an enabling status of the reading enabling signal to a total number of clock cycles of the reading enabling signal equals to a quotient of service clock frequency and OTN clock frequency; the data reading control unit is further configured to continually adjust the number of clock cycles indicating that the reading signal is in the enabling status of the reading enabling signal accordingly through judging whether status of the first buffering unit is empty or full;
the first buffering unit is configured to read the service data flow into the present unit according to an OTN clock, reads out the service data flow from the present unit according to the OTN clock under control of the reading enabling signal and sends to the second buffering unit.

6. The system according to claim 5, wherein,
the service clock recovery module further comprises a phase locked loop (PLL);
the second buffering unit is configured to write the service data flow sent by the first buffering unit into the present unit according to the OTN clock, and then reads out the service data flow locally according to the service clock provided by the PLL;
the PLL is configured to provide the service clock for the second buffering unit, regard a center clock frequency of the PLL as a nominal value of the service clock frequency of the service data flow, and adjust the service clock according to amount of data bulk in the second buffering unit.

7. The system according to claim 5, wherein,
the first buffering unit is further configured with a first threshold value and a second threshold value, data between an original waterline of the first buffering unit and the second threshold value is enough to remedy a longest gap of invalid data written into the first buffering unit in a normal case; a data space between the first threshold value and the original waterline of the first buffering unit is enough to ensure that data in the first buffering unit will not exceed the first threshold value in a case that the data written in the first buffering unit are longest sustained to be valid in the normal case; and data capacity between the first threshold value to fully writing the first buffering unit and the second threshold value and reading empty the first buffering unit is enough to ensure not to make the service data flow in the first buffering unit overflow before corresponding adjustment becomes effective.

8. An optical transport network (OTN) receiving apparatus of a system for service clock transparent transmission in an OTN, wherein, the OTN receiving apparatus comprises a service de-mapping module and a service clock recovery module;
the service de-mapping module is configured to perform a de-mapping operation to an OTN frame after receiving the OTN frame and recover a service data flow therefrom;
the service clock recovery module is configured to perform a two-level buffering operation to the service data flow recovered by the service de-mapping module, wherein,
the service clock recovery module comprises a first buffering unit and a second buffering unit;
the first buffering unit is configured to perform a homogenization treatment to the service data flow and then output to the second buffering unit;
the second buffering unit is configured to output the service data flow according to the service clock after receiving the service data flow after the homogenization treatment;
wherein,
the service clock recovery module further comprises a data reading control unit;
the data reading control unit is configured to generate a reading enabling signal, and control a reading operation of the first buffering unit by using the reading enabling signal; wherein, a preset value of a ratio of a number of clock cycles indicating that a reading signal is in an enabling status of the reading enabling signal to a total number of clock cycles of the reading enabling signal equals to a quotient of service clock frequency and OTN clock frequency; the data reading control unit is further configured to continually adjust the number of cycles indicating that the reading signal is in the enabling status of the reading enabling signal accordingly through judging whether status of the first buffering unit is empty or full;
the first buffering unit is configured to read the service data flow into the present unit according to an OTN clock, reads out the service data flow from the present unit according to the OTN clock under control of the reading enabling signal and sends to the second buffering unit.

9. The apparatus according to claim 8, wherein,
the service clock recovery module further comprises a phase locked loop (PLL);
the second buffering unit is configured to write the service data flow sent by the first buffering unit into the present unit according to the OTN clock, and then reads out the service data flow locally according to the service clock provided by the PLL;
the PLL is configured to provide the service clock for the second buffering unit, regard a center clock frequency of the PLL as a nominal value of the service clock frequency of the service data flow, and adjust the service clock according to amount of data bulk in the second buffering unit.

10. The apparatus according to claim 8, wherein,
the first buffering unit is further configured with a first threshold value and a second threshold value, data between an original waterline of the first buffering unit and the second threshold value is enough to remedy a longest gap of invalid data written into the first buffering unit in a normal case; a data space between the first threshold value and the original waterline of the first buffering unit is enough to ensure that data in the first buffering unit will not exceed the first threshold value in a case that the data written in the first buffering unit are longest sustained to be valid in the normal case; and data capacity between the first threshold value to fully writing the first buffering unit and the second threshold value and reading empty the first buffering unit is enough to ensure not to make the service data flow in the first buffering unit overflow before corresponding adjustment becomes effective.

* * * * *